US011099952B2

(12) United States Patent
Thatikonda et al.

(10) Patent No.: US 11,099,952 B2
(45) Date of Patent: Aug. 24, 2021

(54) LEVERAGING SERVER SIDE CACHE IN FAILOVER SCENARIO

(71) Applicant: International Business Machines Corporation, Armonk, NY (US)

(72) Inventors: Vamshikrishna Thatikonda, Hyderabad (IN); Sanket Rathi, Hyderabad (IN); Venkata N. S. Anumula, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 121 days.

(21) Appl. No.: 16/181,399

(22) Filed: Nov. 6, 2018

(65) Prior Publication Data

US 2020/0142787 A1 May 7, 2020

(51) Int. Cl.
*G06F 11/20* (2006.01)
*G06F 12/0815* (2016.01)

(52) U.S. Cl.
CPC ........ *G06F 11/203* (2013.01); *G06F 11/2094* (2013.01); *G06F 12/0815* (2013.01); *G06F 2201/805* (2013.01); *G06F 2201/815* (2013.01); *G06F 2201/82* (2013.01); *G06F 2212/1032* (2013.01); *G06F 2212/152* (2013.01); *G06F 2212/154* (2013.01)

(58) Field of Classification Search
CPC .............. G06F 11/203; G06F 11/2094; G06F 12/0815; G06F 2212/154; G06F 2201/82; G06F 2212/1032; G06F 2201/805; G06F 2201/815; G06F 2212/152
See application file for complete search history.

(56) References Cited

U.S. PATENT DOCUMENTS

| | | | |
|---|---|---|---|
| 9,275,063 B1* | 3/2016 | Natanzon | G06F 3/065 |
| 9,405,694 B2 | 8/2016 | Goyal | |
| 2015/0039834 A1* | 2/2015 | Cudak | G06F 11/2025 |
| | | | 711/130 |
| 2015/0205722 A1* | 7/2015 | Chiu | G06F 11/2094 |
| | | | 714/4.11 |
| 2015/0363319 A1* | 12/2015 | Qi | G06F 11/2028 |
| | | | 711/121 |
| 2016/0239392 A1* | 8/2016 | Deng | G06F 11/1448 |
| 2017/0168907 A1* | 6/2017 | Harper | G06F 11/2025 |
| 2017/0235653 A1 | 8/2017 | Arikatla | |
| 2017/0374151 A1* | 12/2017 | Moorthi | H04L 67/1097 |
| 2018/0373635 A1* | 12/2018 | Mukherjee | G06F 12/0848 |
| 2020/0110700 A1* | 4/2020 | Shi | G06F 11/1448 |

OTHER PUBLICATIONS

Mehta, Chet, "AIX & PowerVM Server-Side Caching Enhancements", IBM, Updated Sep. 19, 2016 by ChetMehta, 7 pages, <https://www.ibm.com/developerworks/community/wikis/home?lang=en#!/wiki/Power%20Systems/page/AIX%20%26%20PowerVM%20Server-side%20caching%20enhancements>.

Mell et al., "The NIST Definition of Cloud Computing", National Institute of Standards and Technology, U.S. Department of Commerce, Special Publication 800-145, Sep. 2011, 7 pages.

* cited by examiner

Primary Examiner — Bryce P Bonzo
Assistant Examiner — Michael Xu
(74) Attorney, Agent, or Firm — Isaac J Gooshaw; Randy E. Tejeda

(57) ABSTRACT

Populating cache of a virtual server. A data record is generated that is associated with a first virtual server. A set of data is saved that describes data in a cache that is associated with the first virtual server. In response to either (i) a failover of the first virtual server or (ii) a migration request for the first virtual server, a cache of a second virtual server is populated based on the set of data.

20 Claims, 8 Drawing Sheets

LEVERAGING SERVER SIDE CACHE IN FAILOVER SCENARIO

BACKGROUND OF THE INVENTION

The present invention relates generally to the field of computer systems, and more particularly to preserving and leveraging server side cache in failover scenario.

In many scenarios, dense virtual machine (VM) environments can send multiple read-and-write requests to disk arrays, overwhelming the disk controller and resulting in increased storage latency and diminished application performance. Server side caching is the act of caching data on cache devices of the server, e.g., flash storage installed in the server itself. A single cache partition can be used to cache one or more target devices. When a target device is cached, all the read requests for device blocks are routed to the caching software as input/output (I/O) requests.

SUMMARY

Embodiments of the present invention provide a method, a program product, and a computer system for populating cache of a virtual server.

In a first embodiment, a method includes one or more processors that: generate a data record that (i) is associated with a first virtual server and (ii) includes a first data partition and a second data partition; generate a modified data partition by modifying the first data partition to include a set of data that describes hot data stored in a cache of the first virtual server; and respond to either (i) a failover of the first virtual server or (ii) a migration request for the first virtual serve by populating a cache of a second virtual server based, at least in part, on the set of data in the modified data record.

In a second embodiment, a computer program product includes program instructions to: generate a data record that (i) is associated with a first virtual server and (ii) includes a first data partition and a second data partition; generate a modified data partition by modifying the first data partition to include a set of data that describes hot data stored in a cache of the first virtual server; and respond to either (i) a failover of the first virtual server or (ii) a migration request for the first virtual serve by populating a cache of a second virtual server based, at least in part, on the set of data in the modified data record.

In a third embodiment, a computer system includes program instructions to: generate a data record that (i) is associated with a first virtual server and (ii) includes a first data partition and a second data partition; generate a modified data partition by modifying the first data partition to include a set of data that describes hot data stored in a cache of the first virtual server; and respond to either (i) a failover of the first virtual server or (ii) a migration request for the first virtual serve by populating a cache of a second virtual server based, at least in part, on the set of data in the modified data record.

DETAILED DESCRIPTION

Figure 1A:
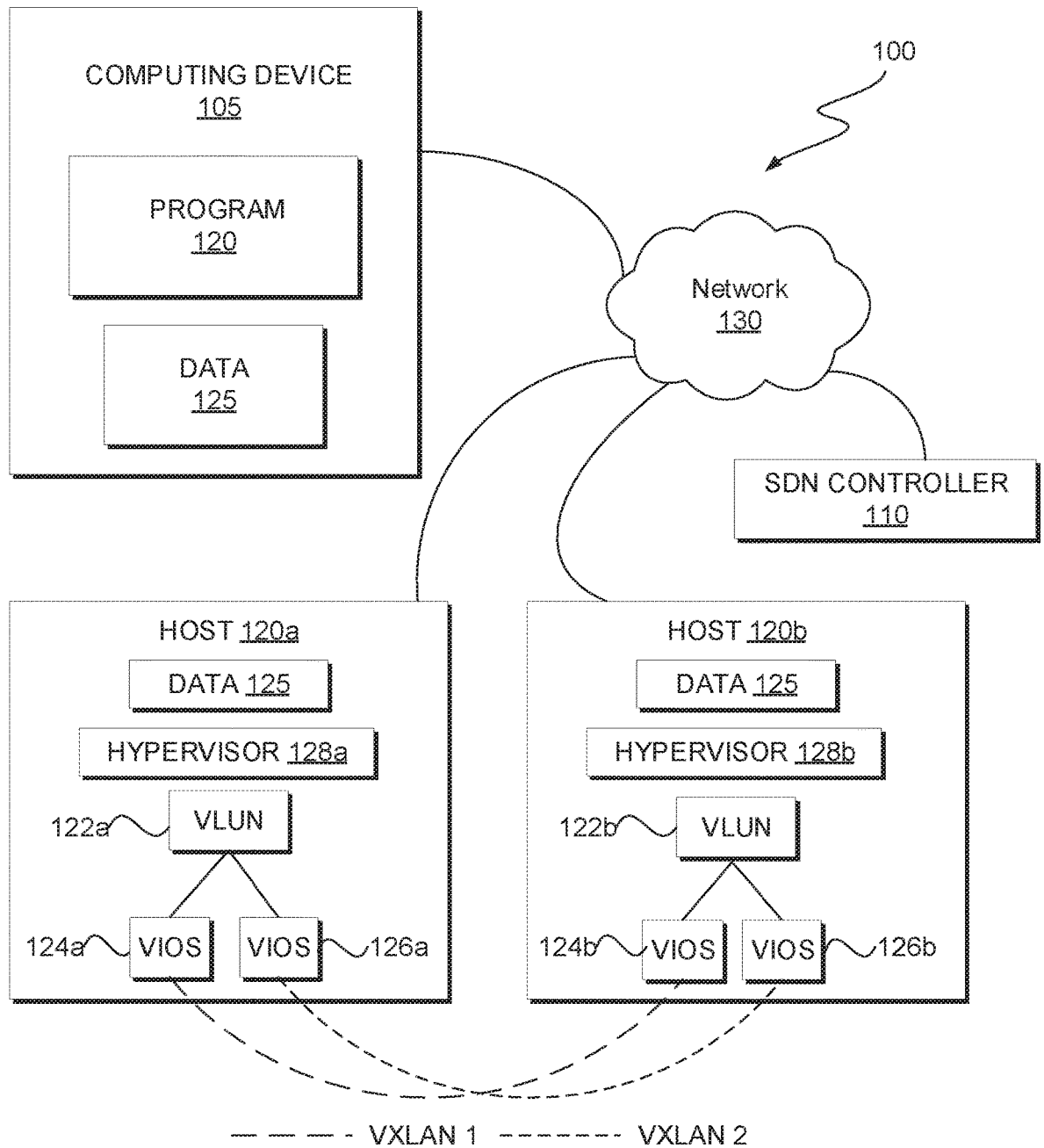
FIG. 1A is a functional block diagram illustrating a computing environment, in accordance with an exemplary embodiment of the present invention.

In various embodiments, in general, if a requested device block is found in the cache, then the I/O request is processed from the cache device. If, however, the requested device block is not found in the cache, or if the initial request was a write request, then the I/O request returns to the target device for processing. By placing flash memory as close to the application as possible typically reduces latency and improves performance for the given computer system.

Embodiments of the present invention recognize that: (i) All information about cached data on a Virtual I/O Server (VIOS) that is serving client I/O is typically lost in a failover scenario. Thus, a new VIOS that replaces the old VIOS is unaware of hot data associated with serving the client I/O, which was already identified by the old VIOS. (ii) That identifying the same hot data on the new VIOS consumes computing resources and increases the time it takes to populate the cache with the hot data associated with serving the client I/O. Embodiments of the present invention also recognize that a VIOS that experiences failover may results in the loss of service to clients, which is typically viewed as being undesirable. As such, embodiments of the present invention recognize that reducing the time needed to recover from a VIOS failover may present benefits a computing system that is configured to provide services to client devices with minimal interruption to those services. Embodiments of the present invention provide preservation of the information about the hot data (for example, by generating a data record that describes the hot data) in a shared location for each cached entity, e.g., in a VLUN. In response to a failover, embodiments of the present invention leverage this data record that describes the hot data to populate the cache of the new VIOS.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1A is a functional block diagram illustrating computing environment, generally designated 100, in accordance with one embodiment of the present invention. FIG. 1A includes a software defined network (SDN) environment for load balancing and failover processing, in accordance with an embodiment of the present invention. Computing environment 100 includes computing device 105 connected over network 130. Computing device 105 includes data 125 and program 120.

In various embodiments of the present invention, computing device 105 is a computing device that can be a standalone device, a server, a laptop computer, a tablet computer, a netbook computer, a personal computer (PC), or a desktop computer. In another embodiment, computing device 105 represents a computing system utilizing clustered computers and components to act as a single pool of seamless resources. In general, computing device 105 can be any computing device or a combination of devices with access to data 125 and program 120, and is capable of executing program 120. Computing device 105 may include internal and external hardware components, as depicted and described in further detail with respect to FIG. 3.

In various embodiments of the present invention, SDN controller 110 is a computing device that can be a standalone device, a server, a laptop computer, a tablet computer, a netbook computer, a personal computer (PC), or a desktop computer. In another embodiment, SDN controller 110 represents a computing system utilizing clustered computers and components to act as a single pool of seamless resources. In general, SDN controller 110 can be any computing device or a combination of devices with access to network load information of hosts 120a-b, VLUNs 122a-b, VIOSs 124a-b and 126a-b and hypervisors 128a-b. SDN controller 110 may include internal and external hardware components, as depicted and described in further detail with respect to FIG. 3.

In this exemplary embodiment, data 125 and program 120 are stored on computing device 105. However, in other embodiments, data 125 and program 120 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 105, data 125 and program 120, in accordance with a desired embodiment of the present invention.

The software defined network (SDN) environment included and illustrated by FIG. 1 leverages load balancing and helps to manage response to failover of VIOS. In various embodiments, the SDN environment includes SDN controller 110 on computing device 105 and hosts 120a-b. SDN controller 110 manages traffic between hosts 120a-b and computing device 105. Each respective VIOS, i.e., VIOS 124a, 126a, 124b and 126b, on hosts 120a-b send and receive traffic to their respective virtual machines (VMs), which are not shown but are incorporated with and supported by VIOS 124 a-b and 126 a-b. Each of hosts 120 a-b include a copy of data 125. Hosts 120 a-b respectively include a virtual logical unit number (respectively denoted VLUN 122a and 122b) that is a shared location for each cached entity and is allocated and associated with the respective VIOS of hosts 120 a-b. Hosts 120a-b provide computing resources to execute the respective VIOSs and VMs provisioned to the host. Hosts 120a-b includes respective hypervisors 128a-b to manage the computing resource of the host in order to provide execution of the respective VIOS and VMs provisioned to the host. One of ordinary skill in the art will appreciate that other embodiments and arrangements of the SDN environment may be provided without deviating from the present invention. In some embodiment, a host of hosts 120a-b include multiple VIOSs with respective VMs. In some embodiments, more than one hypervisor of hypervisors 128a-b are included per hosts 120a-b. For example, a hypervisor is provided for each VM, a subset of VMs, or VIOSs for a given host.

In various embodiments, the SDN environment includes one or more virtual networks. In some scenarios, virtual networks provide a logical network link between devices, or virtualized devices, even though a different physical network connects the devices. In other scenarios, a physical network includes multiple virtual networks. In both scenarios, the SDN environment provides virtual networks for VIOSs 124a-b and 126a-b through a variety of various virtualization techniques or protocols, such as, but not limited to, VXLAN encapsulation or VXLAN tagging through IEEE 802.1Q. VXLAN encapsulation takes a Ethernet Frame sent from a VM and encapsulates the frame as a payload in a packet over the physical networks. The packet includes source and destination MAC addresses and IP addresses for routing. Additionally, the packet includes a VXLAN ID to identify the virtual network of the destination VM. The VXLAN ID provides SDN controller with the information needed to deliver the payload frame to the destination VM. One of ordinary skill in the art will appreciate that any type of virtualization techniques may be used to configure a virtual network without deviating from the invention.

Still referring to FIG. 1A, the SDN environment includes two virtual networks. A first virtual network, VXLAN 1, is configured for VIOSs 124a-b. A second virtual network, VXLAN 2, is configured for VIOSs 126a-b. In one scenario, hosts 120a-b are connected to different sub-nets of the SDN environment. In an example of this scenario, a VM on VIOS 124a sends a frame to communicate with a VM of VIOS 124b. From the perspective of VMs on VIOS 124a, the VM on VIOS 124b is on the same network the frame is being sent to. The frame is encapsulated by a virtual tunnel endpoints (VTEP), associated with VIOS 124b, for transport over the SDN environment. During operation, the VTEP performs occasional multicast messages to various hosts, VTEPs and VMs of the SDN environment to determine IP and MAC addresses of the devices or virtual devices for the various networks of the SDN environment. For example, a VTEP sends an Address Resolution Protocol (ARP) request for MAC addresses of devices connected to the virtual network associated with the VTEP and other networks, physical or virtual. In various embodiments, the VTEPs send the encapsulated packet to SDN controller 110. Based on the destination MAC and IP addresses in the encapsulated packet, SDN controller 110 sends the packet to a corresponding VTEP (e.g., a VTEP associated with VIOS 124*b*) based on the addressing of the packet. The VTEP, in turn sends the payload (i.e., the original Ethernet frame) to the corresponding VM (e.g., a VM of VIOS 124*b*), thereby virtualizing a local network (e.g, VXLAN 1).

In some scenarios and embodiments, a VM requests a service or function of a VM, but does not provide a specific VM address. In other scenarios, a frame may include a destination MAC, however, SDN controller 110 inserts a different MAC address. As discussed herein, SDN controller 110 receives network load information gathered from hosts, VTEPs, hypervisors and VMs to determine a destination address for incoming request. In such scenarios, SDN controller 110 provides load balancing for requests in a virtual network environment. Other embodiments may provide loads balancing as a separate stop or device, in computing environment 100, between SDN controller 110 and hosts 120*a-b*. By providing load balancing by the SDN controller, embodiments of the present invention advantageously provide a simpler network architecture to maintain which benefits provisioning of new VIOS and cache population in the event of VIOS failover.

In one example scenario, the SDN environment provides two virtual networks, a first virtual network supporting a public cloud service, such as a web client application, and a second virtual network supporting a private cloud service, such as a web server application. Each network includes multiple hosts to provide instantiations of VTEPs and VMs. When a public user request access to a web client application, SDN controller 110 directs a hypervisor of a host of the first virtual network to provision a VM for the web client application. Additionally, the hypervisor of the host provisions a VTEP to handle virtual network traffic between SDN controller 110 and any provisioned VMs on the host.

In this example, the web client application requests services from a web server application to provide information to the user, such as database queries used to populate data on a web page. The VM sends a frame to the VTEP with a destination MAC address associated with a virtual device of the second virtual network. If the VTEP includes a destination IP address associated with the MAC address, then the VTEP encapsulates the frame with the destination IP. If the VTEP is unaware of the destination IP address, then the VTEP sends an IP multicast to discover the destination IP address, encapsulating the frame with the destination IP address. In some scenarios, SDN controller 110 performs multicasts and maintains address information for all connected hosts, VTEPs and VMs for each virtual network.

The VTEP sends the encapsulated frame as a packet to SDN controller 110. SDN controller 110 performs packet inspection to determine the destination virtual network. Based on current network load information, SDN controller 110 changes the destination addresses, both IP and MAC, of the packet to select a host and VM to provide optimal load balancing across the virtual networks. By inspecting incoming packets and analyzing network loads, SDN controller 110 can provision and/or select VIOS and VMs without need of a separate load balancing layer for the virtual network. SDN controller 110 forwards the packet to the VTEP associated with the selected VM. The receiving VTEP decapsulates the packet to the frame for receiving by the selected VM. The selected VM confirms receipt to the originating VM to establish the service requested.

In various embodiments, SDN controller 110 receives network load information associated with hosts 120*a-b*, and VIOSs 124*a-b* and 126*a-b*. In some scenarios, hosts 120*a-b*, VIOSs 124*a-b* and 126*a-b* periodically send network load information to SDN controller 110. In other scenarios, SDN controller 110 polls hosts 120*a-b*, VIOSs 124*a-b* and 126*a-b* for current network load information. Additionally, as VMs are provisioned on a host machine, a hypervisor managing the VM sends network load information to SDN controller. Network load information includes, but is not limited to, (i) a current bandwidth used by the host, VTEP, or VM; (ii) an allocated bandwidth for the host, VTEP, or VM; (iii) the current number of sessions hosted by the host, VTEP, or VM; and (iv) the type of sessions hosted by the host, VTEP, or VM.

In some embodiments, the VTEPs of the host (e.g., VTEP of host 120*a*) provide network load information for VMs virtually connected to the VTEP (e.g., VMs associated with VIOS 124*a* and 126*a*) to SDN controller 110. In some scenarios, the VTEP consolidates or combines the network load information of the connected VMs to provide network load information handled by the VTEP. In other embodiments, VMs provide SDN controller 110 with network load information associated with the VM. In another embodiments, the hypervisor of the host (e.g., hypervisor 128*a*) monitors network traffic of any provisioned VTEPs and VMs. The hypervisor provides network load information any provisioned VTEPs and VMs and, in addition, consolidates network load information to provide total network load information for the host (e.g., host 120*a*).

In various embodiments, SDN controller 110 provides load balancing for traffic in one or more virtual networks based on the received network load information of the hosts, VTEPs, and VMs of the SDN environment. SDN controller 110 directs packets and requests to hosts, VIOSs, VTEPs, and VMs associated with a destination virtual network to provide optimal usage of resources of the SDN environment. In one scenario, during provisioning of a new VIOS in response to a VIOS failover or a predicted VIOS failover, SDN controller 110 selects a VTEP on a given host from a group of available VTEPs and hosts based on the current consolidated bandwidth handled by each given VTEP. For example, if one VTEP currently has less bandwidth than another VTEP, the SDN controller 110 selects the first host as a location into which a new VIOS is provisioned using the VTEP. In another scenario, SDN controller 110 selects a host/VTEP based on a ratio between the current bandwidth and allocated bandwidth of each host/VTEP. For example, if one VTEP of a host currently has 8 gigabits per second (gbps) of bandwidth and 10 gbps of allocated bandwidth and another VTEP on another host has 9 gbps of current bandwidth and 10 gbps of allocated bandwidth, then SDN controller 110 selects the first VTEP since that VTEP is less utilized than the latter (i.e., 80% utilization of allocated bandwidth versus 90% utilization).

When a given VIOS experiences or is predicted to undergo failover, requests being sent to the VMs of that VIOS may be held for later processing. For example, a virtual machine on a VIOS supports a number of applications. Requests are received for the applications and processed accordingly. In one such scenario, program 120 determines that the VIOS is predicted to undergo failover, program 120 initiates provisioning of a new VIOS. However, until the new VIOS is provisioned and the cache populated, program 120 redirects the requests being received for the original VIOS and holds them for later processing using the new VIOS. Embodiments recognize that selection of a host for a new VIOS may benefit from accounting for limitations in communication for that host. Embodiments further recognize that selection of a given host may benefit from accounting for the size of a backlog of requests that are stored for processing by the new VIOS. For example, program 120 determines that it will take two minutes to provision a new VIOS on a new host and to populate the associated cache. For those two minutes, program 120 predicts that a backlog of a given size will accumulate based on the expected number of requests for the VMs/applications that are supported by the original VIOS. As such, program 120 selects a host and communication option (e.g., a specific VTEP) that are predicted to allow the newly provisioned VIOS to not only handle new requests being made to the supported VMs/applications but to also process the backlogged requests within a predetermined time period (e.g., thirty seconds). In some embodiments, program 120 instructs the newly provisioned VIOS to ensure that the backlogged requests are processed before more recent requests are processed.

In one scenario, SDN controller 110 selects a host/VTEP based on the total number of sessions or connections the given VTEP is currently handling. For example, a first VTEP on a host is handling 150 active sessions and another VTEP is handling 200 active sessions. In this scenario, SDN controller 110 selects the first VTEP with less active sessions. In one scenario, SDN controller 110 considers the type of active connections. Certain connections types consume more resources and bandwidth than other types. For example, a hypertext transfer protocol (HTTP) connection typically requires less resources (e.g., processing power) and bandwidth than a secure socket layer (SSL) connection. When comparing connection types, SDN controller 110 assigns a resource factor for each type and multiplies the factor by the active connections of each type. For example, a HTTP connection is assigned a 0.25 resource factor and SSL connection is assigned a 0.75 resource factor, reflecting the increase in resource usage a SSL connection has relative to a HTTP connection. In this example, a first VTEP has 50 active HTTP connection and 10 active SSL connections, resulting in a total resource usage factor of 20 (i.e., 50*0.25+ 10*0.75=20.0). A second VTEP has 5 active HTTP connections and 35 active SSL connections, resulting in a total resource usage factor of 27.5 (i.e., 5*0.25+35*0.75=27.5). Even though the first VTEP has more active connections, the usage is less due to the larger amount of resource "light" HTTP requests, when compared to the larger amount of resource "heavy" SSL requests. As such, SDN controller 110 selects the first VTEP since the resources used by the active connections is less than the second VTEP, based on the number and type of connection currently active for both.

In various embodiments, SDN controller 110 collects network load information for each connected host, VTEP and/or VM. In some scenarios, each host, VM and VTEP sends network load information to SDN controller 110. In other scenarios, a hypervisor of the host collects and sends network load information to SDN controller 110. As discussed herein, network load information includes, but is not limited to, (i) a current bandwidth used by the host, VTEP, or VM; (ii) an allocated bandwidth for the host, VTEP, or VM; (iii) the current number of sessions hosted by the host, VTEP, or VM; and (iv) the type of sessions hosted by the host, VTEP, or VM. Upon selecting a VTEP, SDN controller 110 selects a VM for directing network traffic for load balancing in SDN environment.

Similar to selecting a host/VTEP, SDN controller 110 selects a VM, on a newly provisioned VIOS associated with a VTEP, based on current bandwidth, allocated bandwidth, and the number and type of active connections for each available VM on the newly provisioned VIOS. As such, SDN controller selects, a VM with less current bandwidth, ratio of current to allocated bandwidth, active connections, or resource usage based on active connection types. In some scenarios, such as when more than one VTEP is provisioned for a host, SDN controller 110 selects VTEPs and VIOS/ VMs based on the current network load of a host. SDN controller combines all network load information for a host for each provisioned VTEP and VIOS/VM of the host. Based on the current network load information for the provisioned VTEPs and VMs, SDN controller 110 selects a host, VTEP, VIOS, and VM from the SDN environment when processing a backlog of requests for a failed VIOS.

The activity profile of data stored on shared external storage arrays typically shows that only a proportion of data in the external storage arrays is active at any one time. Caching solutions take advantage of this principle to allow resources, such as flash and system dynamic random-access memory (DRAM), to be used as a temporary store for the most active data in use at any one time. Caching solutions can significantly improve application performance using a faster storage that may be a fraction, (as a non-limiting example, 10% or less), of the data stored on the external array, also known as a backing store. This means that issues of performance and throughput can be resolved without requiring the movement of applications to platforms with large amounts of high speed storage, such as all-flash storage arrays.

Caching on hosts 120 *a-b* may be implemented by intercepting data on the I/O path from the application to the external storage device. This approach can be leveraged to increase processing speeds (data input and output rate (I/O rate)) for read requests (reading data from the array) or write requests (writing data to the array). The interception process returns data to the I/O request from a location closer to the processor, such as within the server itself. This may achieved by installing software that is included within the operating system, the hypervisor, or the virtual machine, which may use high speed local storage, such as flash memory, e.g., DRAM. In general, high speed storage, also called primary storage, is a type of memory storage that has a faster access rate, i.e., read/write, I/O, rate, than another, slower, type of memory storage, also called secondary storage, that is included in a given computing system. Secondary storage (which may also be referred to as external memory or auxiliary storage), also differs from primary storage in that secondary storage is not directly accessible by the CPU. In some embodiments, high speed storage uses a different type of storage media/medium and/or storage protocols than the other, slower, type of memory storage. For example, the high speed local storage is flash memory while the other memory storage is a magnetic tape drive, which has a slower I/O rate relative to the I/O rate of flash memory.

In some embodiments, the high speed storage and the other type of slower memory storage both utilize a similar type of storage medium and/or protocol but the high speed storage is physically located closer to a central processing unit (CPU) in a computing system, when compared to a location of the other slower type of memory storage, e.g., a storage device connected to the CPU via a bus. In such embodiments, an increase in the distance a signal has to travel between a given storage media/medium and the CPU reduces the I/O speed for the given storage media/medium. As such, the primary storage has an increased I/O rate when compared to the I/O rate of the secondary storage. In such an embodiment, the pathway length between the CPU and the faster speed memory yields an increase in I/O rate for the faster speed memory, relative to the other slower type of memory storage, since the distance signals have to travel between the faster memory and CPU is less than the distance a signal has to travel between the CPU and the other type of memory. In one embodiment, the faster speed memory is located in a lower tier of a memory hierarchy than the other type of memory, e.g., L4-DRAM is in a lower memory tier than a hard disc drive in a memory hierarchy.

Embodiments recognize that moving all of the data for a system onto an all-flash array may be detrimental in terms of consumption of computing resources when only part of that data is active/being used at any one time. In some embodiments, caching for select applications follow the Pareto principle, also known as the 80/20 rule, which means that 80% of the I/O load is performed by only 20% of the data. Actual figures/percentages may vary in different embodiments and with respect to select applications. However, such ratios often match up to the principle in operation. In a shared storage array, the data will also typically follow a "long tail" curve, with a small number of logical unit numbers (LUNs) creating the majority of the workload. Embodiments recognize that, in certain scenarios, a large amount of data sitting on all-flash arrays is not being used.

Embodiments recognize and provide for at least two caching processes that create either (i) a read cache (where the cache services only read I/O requests) or (ii) a write cache (which services a combination of read and write I/O requests). Embodiments described herein may support one or both methods at the same time, or any other caching approach that falls within the scope of the invention. For write I/O caching, embodiments recognize and provide for at least three methods: write-though, write-back, and write-around. Embodiments described herein may support one or a combination of these methods at the same time, or any other write I/O caching approach that falls within the scope of the invention.

Write-though—in this method the write I/O is written to the cache and immediately written to the backing store before the write is confirmed to the host. Subsequent read requests for the data are then serviced from cache unless the data changes. The write-though method provides high performance for read intensive type workloads and where data has a high likelihood of being re-read soon after write, but may not improve write performance.

Write-back—this process writes data initially to the cache and confirms the I/O back to the host immediately. The data is then offloaded to the backing store some time later as an asynchronous process. This method results in high performance for read and write I/O, however the solution is more exposed as data could be lost if a server or cache failure occurs before all data is de-staged to the backing store. Write-back solutions therefore need some additional protection such as clustering to mitigate hardware failure.

Write-around—this method writes data directly to the backing store rather than into the cache and so only improves read I/O requests. Write-Around solutions are useful where data being written is unlikely to be immediately referenced after the write occurs. It protects against "cache pollution" where the cache fills with inactive data.

Certain benefits of cache solutions are herein articulated to show that cache solutions can improve application performance by using a targeted approach to deploying storage resources. The issue of performance may find emphasis in virtualized environments such as Virtual Server Infrastructure (VSI) and Virtual Desktop Infrastructure (VDI) deployments where the effect of virtualization can create an I/O "blender" effect. This effect herein refers to a phenomenon wherein I/O requests can appear to be almost totally random and relatively unpredictable from the perspective of an application on a VM of a VIOS, since data for servers and applications are distributed across shared data-stores.

Embodiments recognize that, from a technical perspective, use of caching approaches may deliver at least one of, or a combination of: (i) Reduced latency. In other words, I/O responses can be served from local storage thereby eliminating many parts of the I/O stack, which may reduce the amount of time taken to process read/write requests. It is herein noted that both DRAM and flash storage may provide very low latency responses when compared to the performance of other types of storage. (ii) Reduced external I/O. In some scenarios caching reduces or eliminates the need to access an external backing store for the majority of active I/Os. This reduced load on external storage provides an opportunity to reduce contention on external devices and the storage network overall. (iii) Higher throughput. For example, low latency may translate to increased throughput, especially for read-intensive applications. (iv) Increased asset utilization. For example, using a caching solution can ease the pressure on external backing store, potentially increasing capacity utilization or avoiding hardware upgrades.

In virtual server environments, embodiments may implement caching in a number of ways: (i) Within the Hypervisor—wherein the caching software is integrated into the I/O path of the hypervisor. For example, in the device drivers of certain VM software (VMware) environments. The device driver makes decisions on which data to cache in a transparent fashion to the hypervisor itself. (ii) Within a VM, in such solutions, the caching software may sit within a virtual machine on the hypervisor. The VM presents storage to the hypervisor through standard storage protocols. The hypervisor sees the storage as standard externalized storage resources, while the storage VM is responsible for providing cached data blocks and offloading updates to the backing store (if that feature is supported).

In various embodiments, hot data is understood to be data that is predicted to be requested within a time period and at a rate above a threshold by one or more applications. In contrast, cold data, is data that is predicted to have a rate of requests within a time period that is below the threshold. In some embodiments, hot data is identified based on, for example, thresholds that leverage the Pareto principle, which means that the hot data is predicted to be used to perform 80% of the I/O load. Embodiments recognize that other approaches may be leveraged to identify and differentiate hot data from cold data. For example, the top five percent of data may be selected for caching based on a heat map that represents how often a given piece of data is accessed in comparison to other data that is accessed.

In some embodiments, hot data is identified by a cache engine running on a computing device, e.g., a server. In general, server side flash caching is a mechanism through which a computing device, i.e., a host, caches hot Storage Area Network (SAN) disk data on the host attached flash devices. In some embodiments, the host attached flash device is physically attached to the host, while in other embodiments the host attached flash device is physically separate from the host device but is accessible by the host device via the SAN. Host attached flash devices may include, but are not limited to (i) solid state devices (SSD), (ii) Peripheral Component Interconnect (PCI) devices, and (iii) Serial Attached Small Computer System Interface (SCSI), also called SAS, I/O drawer devices. In general, server-side caching provides the capability to cache storage data of target disks from a SAN to flash devices located on a computing device, such, for example, as a server. In some embodiments, based on storage data access pattern of a given application, the caching algorithm determines hot data and stores that hot data in flash devices. If possible, future read requests data are served from the cached data on the flash devices improving application read performance. In some embodiments, write operations are monitored by the caching software to invalidate and/or evict certain cache entries from cache before write operations are sent to the SAN for processing.

Figure 1B:
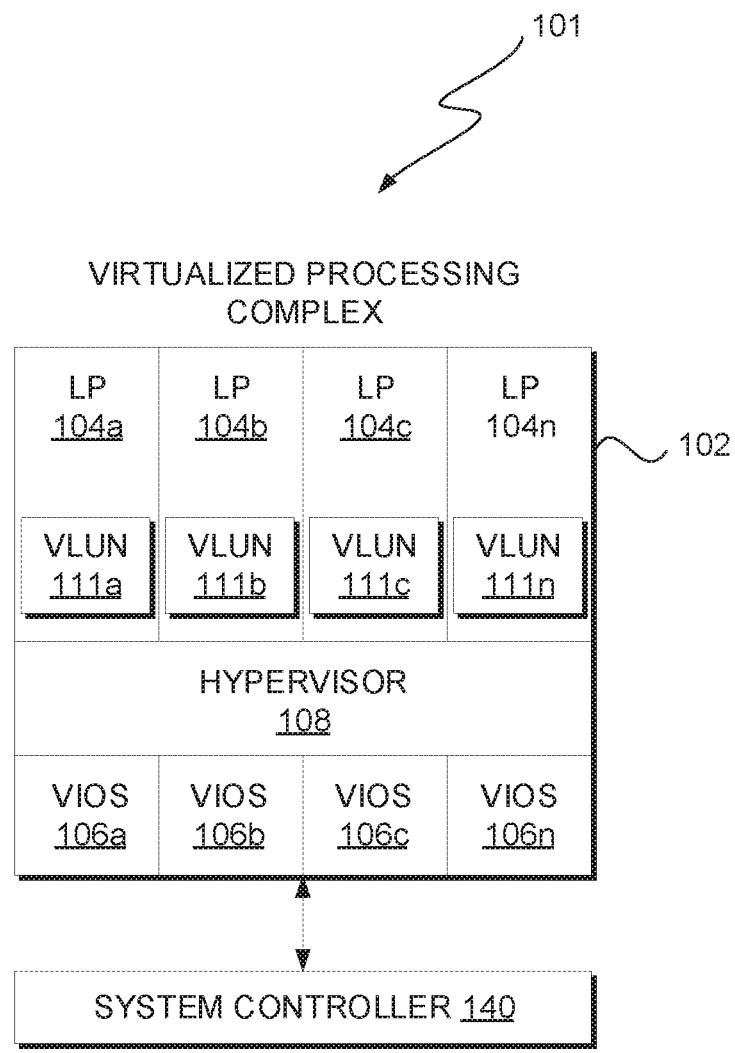
FIG. 1B depicts a virtualized processing complex, in accordance with an exemplary embodiment of the present invention.

A logical partition (LPAR), such as the logical partitions illustrated in FIG. 1B, is the division of a computing devices resources (such as, but are not limited to processors, flash memory, and SAN storage) into multiple sets of resources such that each set of resources can be operated independently with its own operating system instance and application(s). In some embodiments, a VIOS is responsible for storage virtualization to client LPARs. In one embodiment, a group of VIOS across different systems, for example a group of Central Electronics Complex (CEC), are clustered and creates a pool of shared storage (i.e., a shared storage pool) on set of shared SAN disks.

In some embodiments, the devices used for caching are cache partitions of a cache-pool. In some such embodiments, (i) a cache-pool is created in the operating system LPAR on the SSDs attached to the operating system LPAR and (ii) the entire cache-pool is dedicated only to the operating system LPAR. In some such embodiments, since cache-pool is visible only on the operating system LPAR, the same cache-pool can not be shared with other LPARs. Some embodiments provide support for server-side caching by enabling virtualizing of cache partitions through a Virtual I/O Server, such as VIOS1-$m$ of FIG. 1B.

Figure 3:
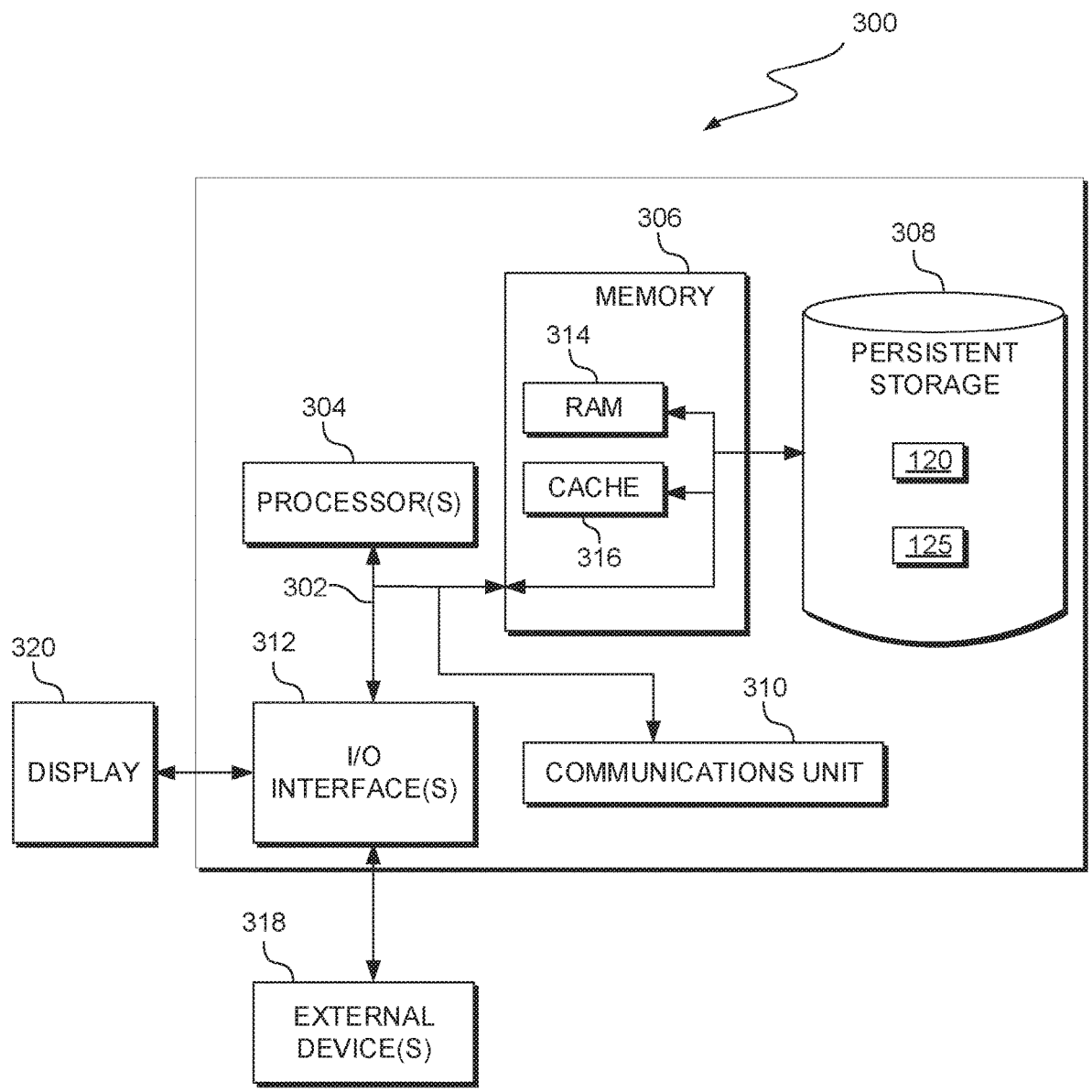
FIG. 3 depicts a block diagram of components of the computing device executing the failover program, in accordance with an exemplary embodiment of the present invention.

FIG. 1B depicts a virtualized processing complex, 101, that is respectively included in hosts 120$a$-$b$ of FIG. 1A, in accordance with an exemplary embodiment of the present invention. Virtualized processing complex 101 includes a processing complex 102 coupled to a system controller 140. Processing complex 102 includes, for instance, one or more partitions with associated VLUNs (e.g., logical partitions LP 104$a$-$n$ with respectively associated VLUN 111$a$-$n$), a number of VIOS (e.g., VIOS 106$a$-$n$), and a hypervisor 108 (e.g., a logical partition manager), all of which is running on computer hardware included in a computing device, such as central processors and memory of a computing device, such as hosts 120$a$-$b$ (which is shown in FIG. 3 and described herein).

Each logical partition 104$a$-$n$ is capable of functioning as a separate system. That is, each logical partition 104$a$-$n$ can be independently reset, initially loaded with an operating system, if desired, and operate with different programs. Such an operating system or application program running in a logical partition 104$a$-$n$ appears to have access to a full and complete system, but in reality, only a portion of it is available. A combination of hardware and Licensed Internal Code (commonly referred to as microcode or millicode) keeps a program in one logical partition from interfering with a program in a different logical partition. This allows several different logical partitions 104$a$-$n$ to operate on a single or multiple physical processors in a time sliced manner. In this particular example, each logical partition 104$a$-$n$ has a respective resident VLUN 111$a$-$n$, which may differ for one or more logical partitions 104$a$-$n$.

Each VIOS 106$a$-$n$ includes one or more central processors, which are physical processor resources that are allocated to the logical partitions 104$a$-$n$. For instance, a logical partition 104 includes one or more logical processors, each of which represents all or a share of physical processor resources allocated to the VIOS 106$a$-$n$. The logical processors of a particular VIOS may be either dedicated to the partition, so that the underlying processor resource is reserved for that partition; or shared with another partition associated with the VIOSa-n, so that the underlying processor resource is potentially available to another partition.

Logical partitions 104$a$-$n$ are managed by hypervisor 108 implemented by microcode running on the processors of VIOS 106$a$-$n$. Logical partitions 104$a$-$n$ and hypervisor 108 each comprise one or more programs residing in respective portions of central storage associated with these central processors.

System controller 140, which is coupled to processing complex 102, includes centralized logic responsible for arbitrating between different processors issuing requests. For example, when system controller 140 receives a quiesce request, it determines that the requester is the initiating processor for that request and that the other processors are receiving processors; it broadcasts messages; and otherwise, handles requests. In the case of a failover of one or more VIOS, e.g., such as a VIOS included in VIOS 106$a$-$n$, system controller 140 coordinates the provisioning of a new VIOS and leverages the functions of program 120 to populate the cache of the new VIOS.

Figure 1C:
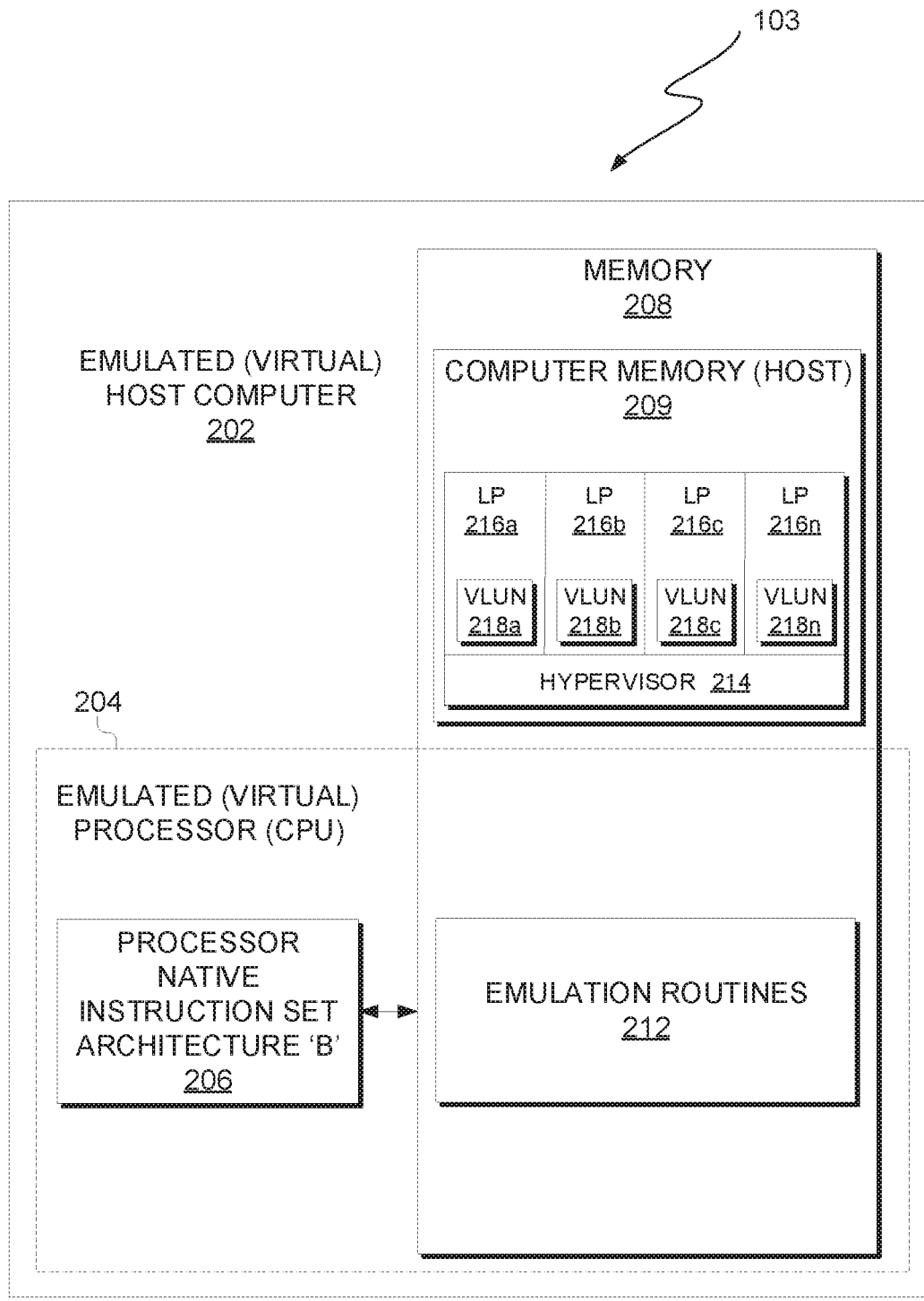
FIG. 1C depicts an emulated host computer system, in accordance with an exemplary embodiment of the present invention.

FIG. 1C depicts an emulated host computer system, 103, in accordance with an exemplary embodiment of the present invention. Emulated host computer system 103 is provided that emulates a host computer system 202 of a host architecture. In emulated host computer system 103, a host processor (CPU) 204 is an emulated host processor (or virtual host processor) and includes an emulation processor 206 having a different native instruction set architecture than used by the processors of host computer 202. Emulated host computer system 103 has memory 208 accessible to emulation processor 206. In the example embodiment, memory 208 is partitioned into a host computer memory 209 portion and an emulation routines 212 portion. In one embodiment, memory 208 represents a pool of shared storage (i.e., a shared storage pool) on set of shared SAN disks. Host computer memory 209 is available to programs of emulated host computer 200 according to host computer architecture, and may include both a host or hypervisor 214 and one or more hypervisors 214 running logical partitions (LPs) 216$a$-$n$ running VLUN 218$a$-$n$, analogous to the like-named elements in FIGS. 1A and 1B. Emulation processor 206 executes native instructions of an architected instruction set of an architecture other than that of the emulated processor 204, the native instructions obtained from emulation routines 212, and may access a host instruction for execution from a program in host computer memory 209 by employing one or more instruction(s) obtained in a sequence and access/decode routine which may decode the host instruction(s) accessed to determine a native instruction execution routine for emulating the function of the host instruction accessed. One such host instruction may be, for example, processor quiesce request initiated by a processing core, by which the host recovers information of an emulated processor 204. The emulation routines 212 may include support for this instruction, and for executing a sequence of guest instructions in accordance with the definition of the quiesce request.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

In some embodiments, SSD disks used for caching are provisioned to a VIOS, such as VIOS 106*a-n* of FIG. 1B. A cache-pool is created with the required SSDs on the VIOS. This cache-pool is segmented into several cache partitions on the VIOS. In some embodiments and scenarios, each cache partition is individually assigned to different virtual host (vhost) adapters. Such embodiments recognize that this mode provides a method to share the SSD disks on the VIOS amongst multiple LPARs, such as LP 104*a-n* and LP 216*a-n*, to be used for caching. Such embodiments recognize that this method can increase performance of workloads running across the operating system LPARs which have been assigned a cache partition. In some such embodiments, the assigned cache partitions are identifiable as cache-disks in each of the individual operating system LPARs. In some such embodiments, on the operating system LPAR, these cache-disks can be directly assigned to desired target disks, and caching started for the target disks.

In some such embodiments, live partition mobility (LPM) is supported for LPARs that have cache partitions carved out from SSDs on the Virtual I/O Server. LPM logic provides the ability to move logical partitions from one system to another. The mobility process transfers the system environment that includes the processor state, memory, attached virtual devices, and connected users. The source and target systems must have access to the same network and SANs but need not be of the same type. Partitions that are to be relocated are typically fully virtualized (i.e. have no dedicated I/O adapters), and in some scenarios and embodiments multi-pathing software is used to fail over to virtual adapters for the duration of the move. In general, any sized partition can be moved; essentially, memory is copied asynchronously from one system to another to create a clone of a running partition, with "dirty" pages being re-copied as necessary. Then, when a threshold is reached (i.e. when a high percentage of the pages have been successfully copied across), the partition is transitioned to the target machine and any remaining pages are copied across synchronously. In some embodiments, the software agents which carry out the memory copying are nominated Virtual I/O Servers on each machine. In some embodiments, LPM is used to avoid service outages for planned server maintenance, for load balancing across multiple servers and for energy conservation. In general, during migration of an operating system LPAR with virtual mode caching enabled, caching for target disks is stopped on the source CEC prior to migration. Caching on the LPAR is then automatically restarted after it reaches the destination CEC. Once caching is restarted on the destination CEC, cache-disk contents are repopulated post migration of the LPAR.

In some embodiments and scenarios, to restart caching on a destination CEC, a cache-pool must already exist on a VIOS of the destination CEC. If a cache-pool exists on the destination VIOS, then LPM logic takes care of creating cache partitions of the required size from the available cache-pool on the destination VIOS and assigns them to the LPAR during migration. However, if a cache-pool does not exist, then a cache-pool is created in the VIOS of the destination CEC. In some embodiments and scenarios, LPM proceeds even if cache partitions cannot be provisioned from the VIOS of the destination CEC. In some embodiments and scenarios, each cache partition on the source VIOS is associated with a flag, which can be set to yes or no value. If the flag is set to yes, then failure to provision such a cache partition on the destination CEC would abort the migration of the LPAR. If the flag is set to no, then the LPM proceeds even when unable to provision cache partition on the destination CEC and target devices are not cached post migration of the LPAR.

In some embodiments and scenarios, when LPM of the LPAR is initiated from a source CEC to destination CEC, caching for the target disks is stopped and cache-disk of the source LPAR is removed automatically by the LPM logic. LPM logic automatically creates new cache partition of the same size from an existing cache-pool present in the destination CEC's VIOS, and assigns the cache partition to the client LPAR. LPM logic discovers the newly assigned cache partition and starts caching for all the target devices for which caching was active on the source CEC. Re-population of hot data blocks to the cache-disk begins once the LPM process starts caching for the target disks.

A logical unit number (LUN) is a unique identifier used on a SCSI channel that enables a host to differentiate between separate devices, such as physical storage allocation. For example, a LUN could reference an entire Redundant Array of Independent Disks (RAID) set, a single hard disk or partition, or multiple disks or partitions. Unlike a physical LUN, the virtual LUN (VLUN) does not map to a specific device or allocation of storage space but a virtualized space, where the number of VLUN that can be created is often in excess of the number of actual physical spaces available. In various embodiments, VLUN, also called files or Logical Units, are created/provisioned from a shared storage pool and they are exported to client LPARs (or VMs) with virtual SCSI (vSCSI) technology. In some embodiments, this shared storage pool is visible to all VIOSs in a given cluster and access to the VLUNs is possible from any VIOS in the cluster. In some embodiments, in a high availability (HA) environment, VLUNs are mapped to the same VM via multiple VIOSs.

In some embodiments, with server side caching, a cache engine executes on each VIOS and analyzes the I/O from the corresponding LPARs on the VLUNs provisioned from the shared storage pool and the caches hot data on those VLUNs locally on each of the VIOS. As such, future read requests to the cached data are driven from, i.e., processed using, data stored on a local cache device on the VIOS rather than using data included in the shared storage pool, for example, data on a SAN. In some embodiments, in the case of a cache miss, the given request is processed using data stored on the SAN.

In some embodiments, in an HA environment, when the primary Virtual I/O Server (i.e., a VIOS with which a client LPAR is presently executing the I/O) goes down, a VM can still drive the I/O to the VLUN via the other VIOSs in the cluster. In another scenario, the VM itself shifts to a new system (e.g., a new CEC) due to, for example but not limited to, maintenance on a given computing system or load optimization, and starts the I/O to the shared storage pool from the VIOS present in the new system.

In these scenarios, since cache is local to each of the VIOS, the relevant hot data of the work load needs to be identified again by the cache engine running on the failed over VIOS and cache needs to be repopulated again. In addition, there is often a reduction in workload throughput due to the sudden drop in the performance of the cache. Embodiments of the present invention addresses at least this problem and minimizes the associated performance degradation.

Embodiments recognize, but are not limited to, two general scenarios that could initiate execution of various aspects of the present invention. The first scenario is when there is a failover (i.e., the existing VIOS supporting a VM is not able to serve I/O). In this scenario, on the same computing device, for example on the same server as the existing VIOS, another VIOS will be used for I/O for the VM. In some embodiments, reassigning the VM to a new VIOS prevents a condition indicating that the existing VIOS supporting the VM has failed. In such scenarios, the VIOS that previously supported the VM may still be flagged as having failed.

Figure 2:
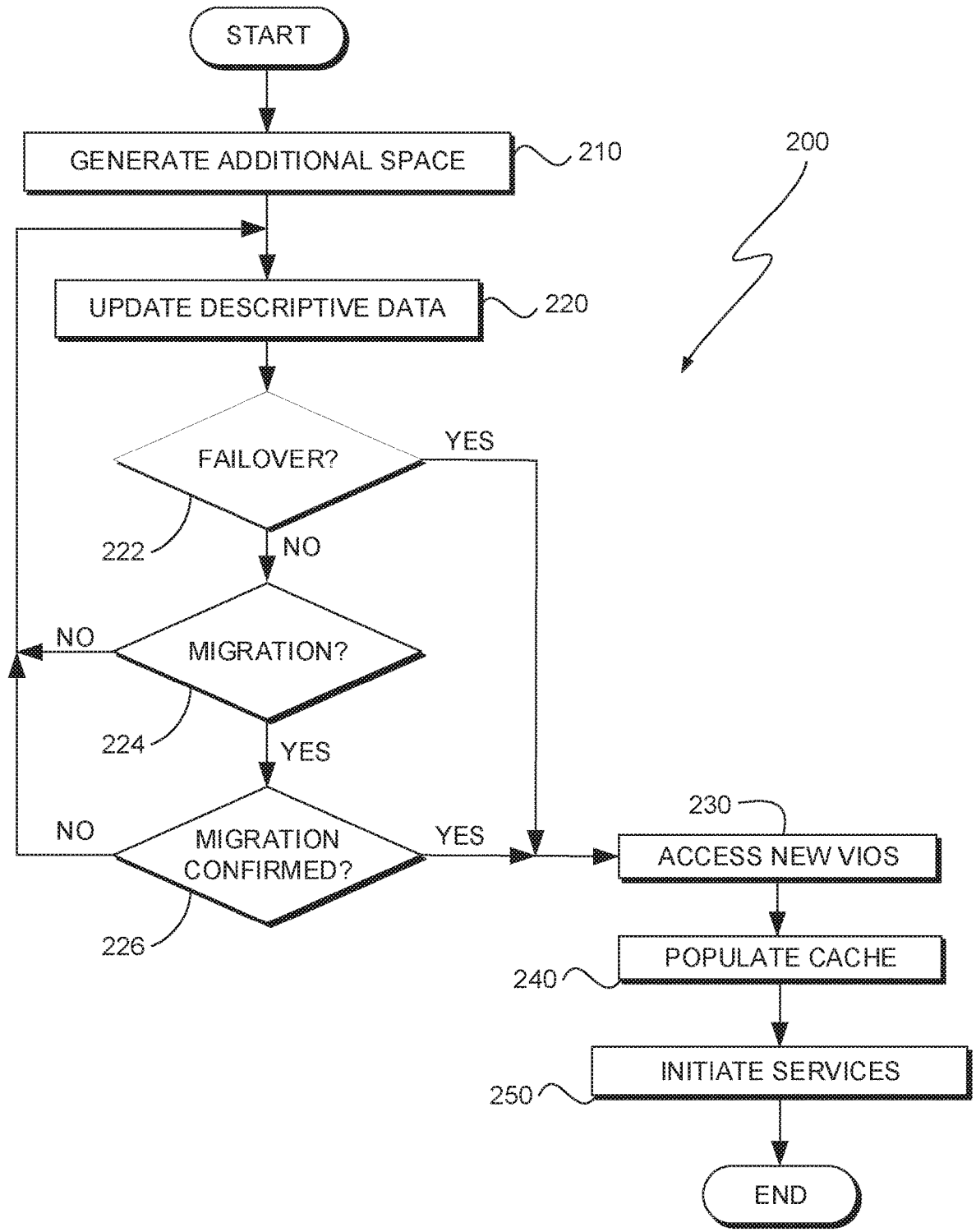
FIG. 2 illustrates operational processes of a failover program, executing on a computing device within the environment of FIG. 1, in accordance with an exemplary embodiment of the present invention.

FIG. 2 illustrates a flowchart, 200, for the operational processes of program 120, executing on computing device 105 within the environment of FIG. 1, in accordance with an exemplary embodiment of the present invention. In general, FIG. 2 illustrates operational processes of program 120 preserving and leveraging server side cache in failover scenario, in accordance with an exemplary embodiment of the present invention.

In some embodiments, program 120 implements instructions that instruct, update, or otherwise use an SSP to generate additional space. As such, in process 210, when a VLUN is created using an SSP, the SSP generates an additional space for use by program 120 as described hereinafter. This additional space is allocated and associated with the VLUN in the shared storage pool (SSP) which is used to preserve data that describes the hot data included in cache that is used by a given VIOS (which supports various VMs and applications thereon). In one embodiment, program 120 includes instructions that instruct an SSP to generate VLUNs when a determination has been made that a new VIOS is needed or been requested. For example, in response to receiving an indication that a failover is imminent for a pre-existing VIOS, program 120 includes instructions that instruct an SSP to generate a new VLUN and VIOS (including the various VMs and applications thereon), and the associated additional space. In another embodiment, program 120 includes instructions that instruct an SSP to generate the additional space when the SSP determines that a new VLUN has been created (the VLUN may be associated with a VIOS and various VMs and applications thereon) by another program, for example by an integrated storage management program that manages virtualization of storage devices to generate virtual logical resources. As such, one having skill in the art appreciates that certain embodiments of program 120 can provision VIOS and generate the VLUN and the additional space on the VLUN using instructions that instruct an SSP to generate the VIOS, VLUN, and the additional space.

In one embodiment, an integrated storage management program adds physical volumes or files to a storage pool, creates virtual disks from the storage capacity of the storage pool, and assigns the virtual disks to partitions. In certain embodiments and scenarios, these virtual disks specify the amount of storage that can be assigned to the given partition. In certain embodiments and scenarios, storage is assigned to logical partitions without regard to the actual capacities of the physical volumes or files that make up the storage pool.

In one embodiment, physical volumes are labeled as virtual logical resources rather than as physical disk devices with logical unit numbers.

In process 220, program 120 preserves the descriptive data that describes the hot data of each cached entity (e.g. for the VLUN that was created) in the associated additional space by updating the cache engine. In certain embodiments, this updating is executed asynchronously at pre-configured intervals. The preserved descriptive data that describes the hot data may include, but is not limited to, (i) pointers, addresses, and other forms of hot data location information associated with the VLUN, as well as (ii) hotness information (for example: an indicator for how frequently this data is accessed relative to either a threshold frequency or other data), and (iii) a timestamp of the data.

Figure 4:
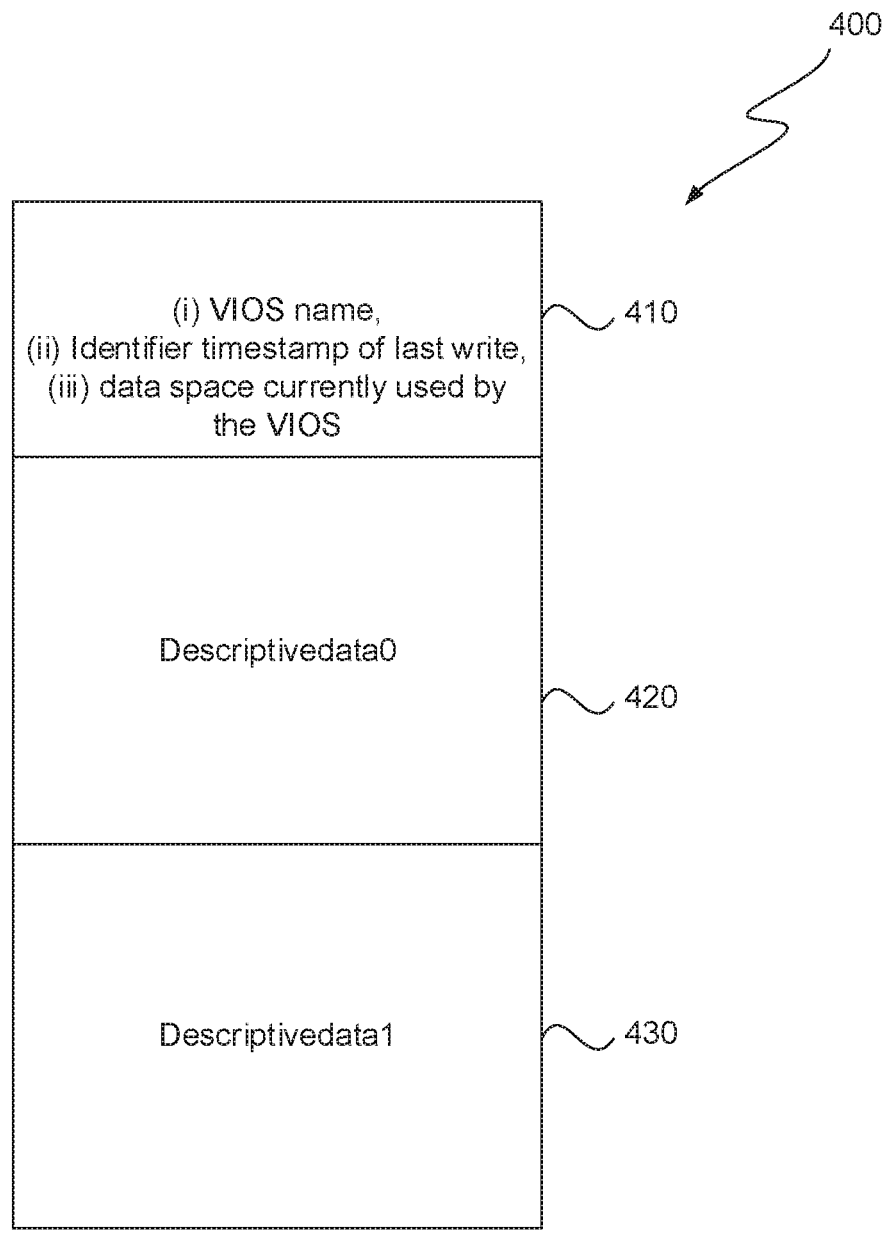
FIG. 4 depicts an example of an additional space that is allocated and associated with a virtual logical unit number (VLUN), in accordance with an exemplary embodiment of the present invention.

FIG. 4 will be discussed herein to provide clarity for the discussion of FIG. 2. FIG. 4 depicts an example of an additional space, 400, that is allocated and associated with a given VLUN, in accordance with an exemplary embodiment of the present invention. In one embodiment, additional space 400 has a data header, which in FIG. 4 is numbered as element 410, and the remaining data space is split into two data partitions, denoted 420 and 430. Element 410 includes: (i) a VIOS name, i.e., the name of the VIOS that last wrote descriptive data about hot data into either data partition 420 or 430 of additional space 400, (ii) an identifier timestamp of that last write, and (iii) a data space (i.e., either data partition 420 or 430) currently used by the VIOS assigned to additional space 400, which can be the same or a different VIOS than the name of the VIOS that last wrote descriptive data about hot data into additional space 400. Embodiments recognize that the additional space may be leveraged under at least one of the four following scenarios:

(i) Whenever the cache engine attempts to preserve the data describing hot data of a cached entity (VLUN), it looks at the header of the additional space associated with the cached entity and determines which VIOS wrote (preserved) the descriptive information regarding the hot data last.

(ii) If the VIOS identifier in the header does not match with the VIOS identifier of current VIOS, then program 120 determines that a failover has occurred and identifies which partition of the descriptive data section (for example: Descriptivedata0/Descriptivedata1 of FIG. 4, numbered as elements 420 and 430 respectively) the previous VIOS was using to preserve the descriptive information regarding the hot data. In one embodiment, program 120 detecting different VIOS identifier acts as a trigger to identify failover scenario for a given VIOS identified in the header.

(iii) Failover program 120 instructs the current VIOS to start using the other/second partition of the descriptive data section (for example Descriptivedata1 of FIG. 4) to preserve the descriptive information regarding the hot data and updates the header to reflect the current VIOS identifier and the partition the current VIOS is using to preserve the descriptive information regarding the hot data. Embodiments recognize that more than two data partitions may be generated and that the header would be updated to reflect whichever data partition is being used by a current VIOS.

(iv) During the process of preserving the descriptive information regarding the hot data, by updating a currently used data partition, a given VIOS compares the VIOS identifier in the additional space to its own VIOS identifier. Responsive to determining that the VIOS identifiers are a match, (i) the current VIOS uses the data partition identified by the header (for example, either 420 or 430 in FIG. 4) to preserve the descriptive information regarding the hot data in that data partition, and (ii) updates the timestamp in the header.

So, at each failover, the new VIOS toggles the partition number in the header and uses that partition for preserving the descriptive information regarding the hot data and leverages the descriptive information regarding the hot data in the other partition which is preserved by previous VIOS.

In decision process 222, program 120 determines whether a failover has been indicated for a given VIOS. In some scenarios, program 120 determines that a failover for a given VIOS has occurred based on, for example, but is not limited to, a received indicator that the failover has occurred or a loss of communications with a given VIOS. In other scenarios, program 120 determines that a failover of a VIOS has been predicted based on various indicators, which are understood by those having skill in the art. For example, the existence of certain scenarios, such as consumption of computing resources, number of requests, response time for processing requests etc., may indicate that a given VIOS is likely to failover. In one such embodiment and scenario, a server hosts multiple VIOS. As such, when there is an actual failover, i.e., the existing VIOS is not able to serve I/O for the VMs, another VIOS on that same server is configured for the VM and takes over processing that I/O. If program 120 determines that a failover of a given VIOS has not occurred (decision process 224, NO branch), then program 120 proceeds to decision process 224. If program 120 determines that a failover has occurred for a given VIOS (decision process 222, YES branch), then program 120 proceeds to process 230.

In some embodiments and scenarios, there may be a predicted failure of a given VIOS that does not occur. As such, since the old VIOS continued to function, the descriptive information regarding the hot data may no longer correlate to the data that is actually included in the cache of the old VIOS since the two are no longer synchronized. In this embodiment, program 120 confirms whether there was an actual failover of the old VIOS by comparing the names of functioning VIOS s, i.e., a list of VIOS that are functioning as intended, to the name of the VIOS included in the header (410) of additional space 400. If the names match, then program 120 determines there was no failover of the old VIOS. If the names do not match, then program 120 determines that there was an actual failover of the old VIOS. In such embodiments and scenarios, the additional space may be reassigned back to the old VIOS and the new VIOS disabled. In one embodiment, in response to confirming that the old VIOS has experienced a failover, program 120 updates the name included in the header (410) of additional space 400 to reflect the name of the new VIOS that is replacing the old VIOS. In one embodiment, program 120 maintains a list of VIOS and the additional space 400 respectively assigned to each additional space 400. As such, when confirming whether a given VIOS has failed over, program 120, confirms whether the VIOS previously assigned to a given additional space is functioning an intended or has experienced a failover before proceeding to either decision process 224 or process 230.

In decision process 224, program 120 determines whether a request for migration of a given VM has been received. If a request for migration of a given VM has been received (decision process 224, YES branch), then program 120 proceeds to decision process 226. If a request for migration of a given VM has not been received (decision process 224, NO branch), then program 120 returns to process 220 and continues to update the descriptive information that describes the hot data that is stored in the cache associated with the given VIOS. In one embodiment and scenario, a request to migrate a VM from one server, a current host, to another server, a new host, is generated because of maintenance activity on the server currently hosting the VM, i.e., the current host. In this example, the existing VIOS is functioning as intended, i.e., has not failed over nor is the VIOS of the current server predicted to failover. In this example, a user has initiated a VM migration to another server, which will use a different VIOS from that server to host the VM. Embodiments recognize that migration can fail for any number of reasons and the VM can still use the existing VIOS on the current host, i.e., the VM will not be migrated.

In decision process 226, program 120 confirms whether there was an actual migration to the new VIOS before initiating a repopulation of the cache. If a migration to the new VIOS is confirmed (decision process 226, YES branch), then program 120 proceeds to process 230. In one example, when there is an actual migration, i.e., the existing old VIOS is able to serve I/O for the VMs but another VIOS on a different server takes over serving I/O for the VMs. If program 120 determines that there was no migration of the old VIOS (decision process 226, NO branch), then program 120 returns to process 220 and continues to update the descriptive information that describes the hot data that is stored in the cache associated with the given VIOS. In an example, the migration was initiated but failed to complete to I/O processing continues on the old VIOS, i.e., due to a failed migration, the old VIOS continues to serve I/O for the VMs instead of that I/O processing being passed to the new VIOS on a different server.

In process 230, program 120 accesses a new VIOS. In this embodiment, accessing the new VIOS may include (i) assigning the additional space to the new VIOS or (ii) copying some or all of the data regarding hot data to a different additional space that is assigned to the new VIOS. For example, for migration, an old VIOS is on a first sever and the new VIOS is on a second server. As such, some or all of the data regarding hot data that is assigned to the old VIOS is saved to the additional space of the new VIOS on the second server. In one embodiment, the new VIOS is prepared in advance in anticipation of either a migration or failover of a VIOS. For example, regarding failover scenarios, a number of VIOS are prepared in advance that have access to the same VLUN. As such, in response to a failover scenario, a new VIOS on that VLUN is accessed that has access to the data regarding hot data that is assigned to the old VIOS. In another embodiment, a new VIOS is created in response to an indication that a migration is planned. Embodiments recognize that a variety of VIOS may be created on various servers for any number of reasons that are within the scope of this invention. In some scenarios, the new VIOS is on the same server as the original VIOS. In other scenarios the new VIOS is on a different server than the original VIOS. In some embodiments, for migration, VMs are provisioned on another server and they start using a VIOS (from that server) once migration is completed to process I/O. In some scenarios and embodiments, accessing a new VIOS includes one or a combination of preparation processes, including, but are not limited to, generating, on a server, a new VLUN, VIOS, and the various VMs and applications associated with that VIOS.

In process 240, program 120 initiates population of the cache of the new VIOS based on the descriptive information regarding the hot data that is included in the additional space, which was preserved in a portion of the additional space by the previous VIOS. In general, program 120 leverages the descriptive information regarding the hot data by initiating the population of the cache of the new VIOS based on the descriptive information regarding the hot data that was preserved by the previous VIOS, which populated the additional space. In some scenarios and embodiments, program 120 determines that the cache hit ratio for the newly populated cache is too low, i.e., indicating that there is less than a threshold of hot data stored in the cache of the new VIOS. For example, if there is, for example, an unexpected delay in starting the new VIOS or a large backlog of requests, then the descriptive information regarding the hot data may become stale, i.e., no longer indicate which data is hot. In response, program 120 repopulates the cache based on a new determination of hot data.

In this embodiment, program 120 populates the cache of the new VIOS by executing cache population logic that starts queuing up population requests from a SAN to the cache based on the already read hot data, based on the updated descriptive data. In some embodiments and scenarios, program 120 analyzes the timestamp in the header of the additional space, 410 of FIG. 4, to determine whether the new VIOS should use the descriptive information regarding the hot data identified by the previous VIOS. In some scenarios, program 120 determines that the current VIOS should not use the descriptive information regarding the hot data identified by the previous VIOS based on one or more requirements not being met. For example, based on the timestamp in 410, the descriptive information regarding the hot data may be too old and may no longer be relevant. In such a scenario, the cache is populated based on newly determined hot data, i.e., data that is determined to be hot within a time period that indicates it is likely to be accessed again with at least a frequency that indicates that the data is hot data.

In process 250, program 120 activates the new VIOS is activated such that the VMs and their associated applications begin to process client requests, i.e., provides services to clients. As part of this activation, program 120 updates the VIOS name associated with element 410 of additional space. Further, program 120 toggles the data space currently used by the VIOS assigned to additional space. For example, if the old VIOS was using data partition 420 (descriptivedata0), then the new VIOS would be assigned to and begin saving its descriptive data regarding hot data to data partition 430 (descriptivedata1). The descriptive data regarding hot data that was saved by the old VIOS would thus be retained as part of additional space 400 until the new VIOS experiences a failover and a subsequent VIOS overwrites it. As such, both the current descriptive data regarding hot data of a current VIOS may be retained along with descriptive data regarding hot data of the immediately preceding VIOS. As the new VIOS saves descriptive data regarding hot data to its assigned data partition, program 120 updates the identifier included in element 410 to reflect the timestamp of the last write to the data partition of the new VIOS.

In one embodiment, program 120 completes a recovery from a failover of a virtual server. Failover program 120 generates a data record, such as 400 of FIG. 4, that (i) is associated with a first virtual server and (ii) includes a first data partition and a second data partition, such as 420 and 430 of FIG. 4.

Failover program 120 generates a modified data partition by modifying the first data partition to include a set of data that describes hot data stored in a cache of the first virtual server. Failover program 120 generates responds to a failover of the first virtual server by populating a cache of a second virtual server based, at least in part, on the set of data in the modified data record data partition.

In one embodiment, program 120 generates an entry in the data record that includes (i) a first portion of data that includes an identity of a given virtual server that is currently associated with the data record and (ii) a second portion of data that includes at least the first data partition and the second data partition.

In one embodiment, program 120 saves, in the first portion of data, an identity of the first virtual server as the identity of the given virtual server that is currently associated with the data record.

In one embodiment, program 120 determines that a failover has occurred based on a determination that an identity of the second virtual server is different from the identity of the given virtual server included in the first portion of data.

In one embodiment, program 120 responds to the failover of the first virtual server by assigning the modified data record to the second virtual server.

In one embodiment, program 120 saves a set of data that describes data stored in a cache of the second virtual server as part of the second data partition.

In one embodiment, program 120 responds to a determination that an identity of the first virtual server matches an identity of a virtual server included in a header of the modified data record (such as header 410) by updating (i) the set of data based on changes to data stored in a cache of the first virtual server and (ii) a timestamp included in the header.

In one embodiment, program 120 responds to a determination that a cache hit ratio of the cache of the second virtual server is below a threshold by repopulating the cache of the second virtual server based on a new determination of a new set of hot data.

In one embodiment, program 120 updates the modified data record by modifying the second data partition to include a set of data that describes the new set of hot data stored in the cache of the second virtual server.

In one embodiment, program 120 toggles saving data to either the first data partition or the second data partition based, at least in part, on a determination of which virtual server last updated data stored in the modified data record.

FIG. 3 depicts a block diagram, 300, of components of computing device 105, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 105 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Data 125 and program 120 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media/medium that is capable of storing program instructions or digital information.

The media/medium used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Data 125 and program 120 may be downloaded to persistent storage 308 through communications unit 310.

I/O interface(s) 312 allows for input and output of data with other devices that may be connected to computing device 105. For example, I/O interface 312 may provide a connection to external devices 318 such as a keyboard, keypad, a touch screen, and/or some other suitable input device. External devices 318 can also include portable computer-readable storage media/medium such as, for example, thumb drives, portable optical or magnetic disks, and memory cards. Software and data used to practice embodiments of the present invention, e.g., data 125 and program 120, can be stored on such portable computer-readable storage media/medium and can be loaded onto persistent storage 308 via I/O interface(s) 312. I/O interface(s) 312 also connect to a display 320.

Display 320 provides a mechanism to display data to a user and may be, for example, a computer monitor, or a television screen.

FIG. 4 depicts an example of an additional space that is allocated and associated with the VLUN, in accordance with an exemplary embodiment of the present invention. The additional space includes a header and the remaining space split into two partitions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
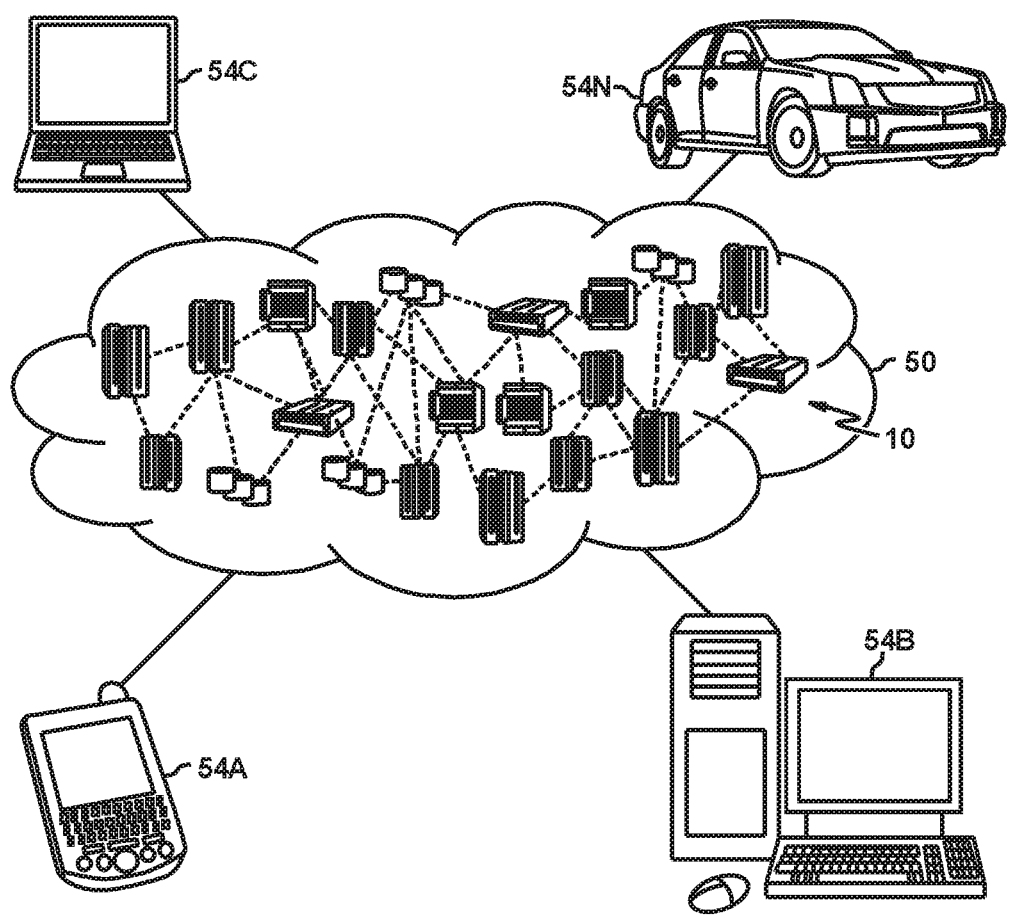
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
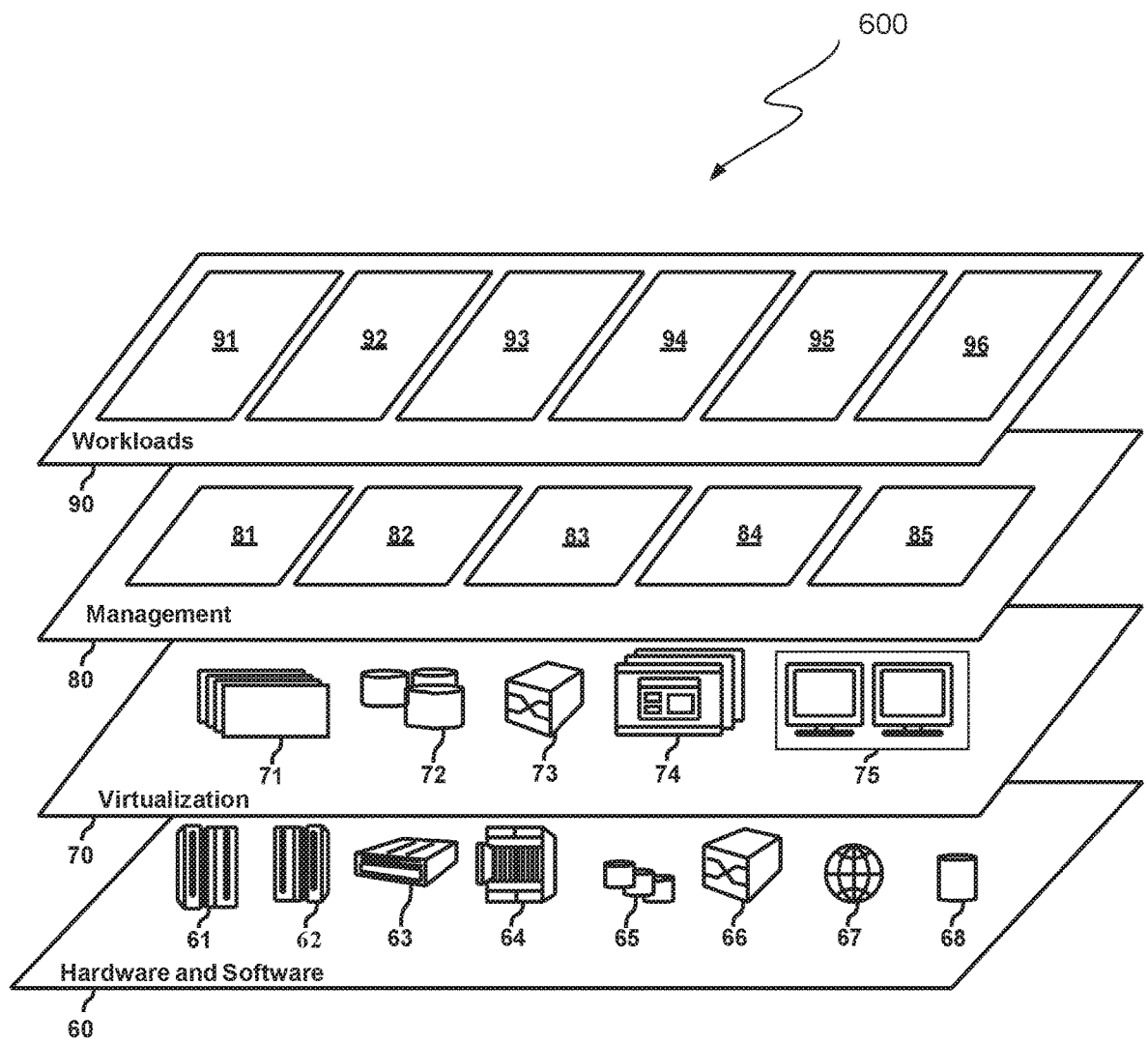
FIG. 6 depicts abstraction model layers according to an embodiment of the present invention.

Referring now to FIG. 6, a set of functional abstraction layers, 600, provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Metering and Pricing 81 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 82 provides access to the cloud computing environment for consumers and system administrators. Service level management 83 provides cloud computing resource allocation and management such that required service levels are met. Service Level Agreement (SLA) planning and fulfillment 84 provide pre-arrangement for, and procurement of, cloud computing resources for which a future requirement is anticipated in accordance with an SLA. Resource provisioning 85 provides dynamic procurement of computing resources and other resources that are utilized to perform tasks within the cloud computing environment. In some scenarios, resource provisioning 85 provides load balancing in cloud computing environment 50 based on information gathered from virtualization layer 70 including but not limited to current bandwidth, allocated bandwidth, and the type of network traffic sent and received from virtual tunnel endpoints (VTEPs) in one or more virtual networks 73.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method of populating cache of a virtual server, the method comprising:
generating, by one or more processors, a data record that (i) is associated with a first virtual server and (ii) includes a first data partition and a second data partition;
generating, by the one or more processors, a modified data partition by modifying the first data partition to include a set of data that describes hot data stored in a cache of the first virtual server, wherein the hot data contains one or more client I/O requests;
responsive to either (i) a failover of the first virtual server, (ii) a migration request for the first virtual server, or (iii) a predicted failover of the first virtual server, predicting, by the one or more processors, a size of a backlog based on expected hot data from one or more applications that are supported by the first virtual server and the modified data partition, wherein the predicted failover is based on a consumption of computing resources, a number of requests, and a response time for processing the number of requests;
selecting, by the one or more processors, a virtual tunnel endpoint to encapsulate the predicted backlog based a number of concurrent sessions associated with the virtual tunnel endpoint and a host predicted to allow one or more new client I/O requests and process the hot data within a time period based on the predicted size of the backlog; wherein each concurrent session in the number of concurrent sessions is associated with a resource type and an associated resource factor;
populating, by the one or more processors, a cache of the selected host based, at least in part, on the set of data in the modified data record data partition; and
responsive to a migration of a threshold percentage of hot data to the selected host, transitioning, by the one or more processors, the generated modified data partition, associated new client I/O requests, and backlogged hot data to the selected host, wherein backlogged hot data is transitioned before the new client I/O requests.

2. The method of claim 1, the method further comprising:
generating, by the one or more processors, an entry in the data record that includes (i) a first portion of data that includes an identity of a given virtual server that is currently associated with the data record and (ii) a second portion of data that includes at least the first data partition and the second data partition.

3. The method of claim 2, the method further comprising:
saving, by the one or more processors, in the first portion of data, an identity of the first virtual server as the identity of the given virtual server that is currently associated with the data record; and
determining, by the one or more processors, that a failover has occurred based on a determination that an identity of the selected host is different from the identity of the given virtual server included in the first portion of data.

4. The method of claim 1, the method further comprising:
responsive to a failover of the first virtual server, assigning, by the one or more processors, the modified data record to the selected host; and
saving, by the one or more processors, a set of data that describes data stored in a cache of the selected host as part of the second data partition.

5. The method of claim 1, the method further comprising:
responsive to a determination that an identity of the first virtual server matches an identity of a virtual server included in a header the modified data record, asynchronously updating, by the one or more processors, (i) the set of data based on changes to data stored in a cache of the first virtual server, (ii) a timestamp included in the header, (iii) hotness information, and (iv) associated pointers, wherein hotness information is an indicator for how frequently the set of data is accessed relative to either a threshold frequency or other sets of data.

6. The method of claim 1, the method further comprising:
responsive to a determination that a cache hit ratio of the cache of the selected host is below a threshold, repopulating, by the one or more processors, the cache of the selected host based on a new determination of a new set of hot data; and
updating, by the one or more processors, the modified data record by modifying the second data partition to include a set of data that describes the new set of hot data stored in the cache of the selected host.

7. The method of claim 1, wherein saving data to either the first data partition or the second data partition is toggled based, at least in part, on a determination of which virtual server last updated data stored in the modified data record.

8. A computer program product for populating cache of a virtual server, the computer program product comprising:
one or more computer-readable storage media and program instructions stored on the one or more computer-readable storage media, the program instructions comprising:
program instructions to generate a data record that (i) is associated with a first virtual server and (ii) includes a first data partition and a second data partition;
program instructions to generate a modified data partition by modifying the first data partition to include a set of data that describes hot data stored in a cache of the first virtual server, wherein the hot data contains one or more client I/O requests;
program instructions to respond to either (i) a failover of the first virtual, (ii) a migration request for the first virtual server, or (iii) a predicted failover of the first virtual server, to predict a size of a backlog based on expected hot data from one or more applications that are supported by the first virtual server and the modified data partition, wherein the predicted failover is based on a consumption of computing resources, a number of requests, and a response time for processing the number of requests;
program instructions to select a virtual tunnel endpoint to encapsulate the predicted backlog based a number of concurrent sessions associated with the virtual tunnel endpoint and a host predicted to allow one or more new client I/O requests and process the hot data within a time period based on the predicted size of the backlog; wherein each concurrent session in the number of concurrent sessions is associated with a resource type and an associated resource factor;
program instructions to populate a cache of the selected host based, at least in part, on the set of data in the modified data record data partition; and
program instructions to respond to a migration of a threshold percentage of hot data to the selected host, transition the generated modified data partition, associated new client I/O requests, and backlogged hot data to the selected host, wherein backlogged hot data is transitioned before the new client I/O requests.

9. The computer program product of claim 8, the method further comprising:
program instructions to generate an entry in the data record that includes (i) a first portion of data that includes an identity of a given virtual server that is currently associated with the data record and (ii) a second portion of data that includes at least the first data partition and the second data partition.

10. The computer program product of claim 9, the method further comprising:
program instructions to save, in the first portion of data, an identity of the first virtual server as the identity of the given virtual server that is currently associated with the data record; and
program instructions to determine that a failover has occurred based on a determination that an identity of the selected host is different from the identity of the given virtual server included in the first portion of data.

11. The computer program product of claim 8, the method further comprising:
program instructions to respond to a failover of the first virtual server by assigning the modified data record to the selected host; and
program instructions to save a set of data that describes data stored in a cache of the selected host as part of the second data partition.

12. The computer program product of claim 8, the method further comprising:
program instructions to respond to a determination that an identity of the first virtual server matches an identity of a virtual server included in a header the modified data record by updating (i) the set of data based on changes to data stored in a cache of the first virtual server and (ii) a timestamp included in the header.

13. The computer program product of claim 8, the method further comprising:
program instructions to respond to a determination that a cache hit ratio of the cache of the is below a threshold by repopulating the cache of the selected host based on a new determination of a new set of hot data; and program instructions to update the modified data record by modifying the second data partition to include a set of data that describes the new set of hot data stored in the cache of the selected host.

14. The computer program product of claim 8, wherein saving data to either the first data partition or the second data partition is toggled based, at least in part, on a determination of which virtual server last updated data stored in the modified data record.

15. A computer system for populating cache of a virtual server, the computer system comprising:

one or more computer processors;

one or more computer readable storage medium; and program instructions stored on the computer readable storage medium for execution by at least one of the one or more processors, the program instructions comprising:

program instructions to generate a data record that (i) is associated with a first virtual server and (ii) includes a first data partition and a second data partition;

program instructions to generate a modified data partition by modifying the first data partition to include a set of data that describes hot data stored in a cache of the first virtual server, wherein the hot data contains one or more client I/O requests;

program instructions to respond to either (i) a failover of the first virtual, (ii) a migration request for the first virtual server, or (iii) a predicted failover of the first virtual server, predict a size of a backlog based on expected hot data from one or more applications that are supported by the first virtual server and the modified data partition, wherein the predicted failover is based on a consumption of computing resources, a number of requests, and a response time for processing the number of requests;

program instructions to select a virtual tunnel endpoint to encapsulate the predicted backlog based a number of concurrent sessions associated with the virtual tunnel endpoint and a host predicted to allow one or more new client I/O requests and process the hot data within a time period based on the predicted size of the backlog; wherein each concurrent session in the number of concurrent sessions is associated with a resource type and an associated resource factor;

program instructions to populate a cache of the selected host based, at least in part, on the set of data in the modified data record data partition; and program instructions to respond to a migration of a threshold percentage of hot data to the selected host, transition the generated modified data partition, associated new client I/O requests, and backlogged hot data to the selected host, wherein backlogged hot data is transitioned before the new client I/O requests.

16. The computer system of claim 15, the method further comprising:

program instructions to generate an entry in the data record that includes (i) a first portion of data that includes an identity of a given virtual server that is currently associated with the data record and (ii) a second portion of data that includes at least the first data partition and the second data partition.

17. The computer system of claim 16, the method further comprising:

program instructions to save, in the first portion of data, an identity of the first virtual server as the identity of the given virtual server that is currently associated with the data record; and program instructions to determine that a failover has occurred based on a determination that an identity of the selected host is different from the identity of the given virtual server included in the first portion of data.

18. The computer system of claim 15, the method further comprising:

program instructions to respond to a failover of the first virtual server by assigning the modified data record to the selected host; and program instructions to save a set of data that describes data stored in a cache of the selected host as part of the second data partition.

19. The computer system of claim 15, the method further comprising:

program instructions to respond to a determination that an identity of the first virtual server matches an identity of a virtual server included in a header the modified data record by updating (i) the set of data based on changes to data stored in a cache of the first virtual server and (ii) a timestamp included in the header.

20. The computer system of claim 15, the method further comprising:

program instructions to respond to a determination that a cache hit ratio of the cache of the selected host is below a threshold by repopulating the cache of the selected host based on a new determination of a new set of hot data; and program instructions to update the modified data record by modifying the second data partition to include a set of data that describes the new set of hot data stored in the cache of the selected host.

\* \* \* \* \*